United States Patent
Sui et al.

(10) Patent No.: US 12,495,151 B2
(45) Date of Patent: Dec. 9, 2025

(54) BLOCK-BASED LONG-RANGE CONTEXT MODEL IN NEURAL IMAGE COMPRESSION

(71) Applicant: Tencent America LLC, Palo Alto, CA (US)

(72) Inventors: Yang Sui, Piscataway, NJ (US); Ding Ding, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 287 days.

(21) Appl. No.: 18/458,507

(22) Filed: Aug. 30, 2023

(65) Prior Publication Data
US 2024/0214592 A1    Jun. 27, 2024

Related U.S. Application Data

(60) Provisional application No. 63/435,513, filed on Dec. 27, 2022.

(51) Int. Cl.
*H04N 19/42* (2014.01)
*H04N 19/119* (2014.01)
(Continued)

(52) U.S. Cl.
CPC ........... *H04N 19/42* (2014.11); *H04N 19/119* (2014.11); *H04N 19/167* (2014.11); *H04N 19/176* (2014.11)

(58) Field of Classification Search
CPC .... H04N 19/42; H04N 19/119; H04N 19/167; H04N 19/176; H04N 19/13; H04N 19/91
See application file for complete search history.

(56) References Cited

U.S. PATENT DOCUMENTS

2020/0090069 A1*  3/2020  Mandt ...................... G06N 3/08
2020/0304802 A1*  9/2020  Habibian ............. H04N 19/124
(Continued)

OTHER PUBLICATIONS

Hawthorne et al. "General-purpose, long-context autoregressive modeling with Perceiver AR.", Proceedings of the 39th International Conference on Machine Learning, PMLR 162, Jul. 2022. (Year: 2022).*

(Continued)

*Primary Examiner* — John R Wallace
(74) *Attorney, Agent, or Firm* — Sughrue Mion, PLLC

(57) ABSTRACT

Methods and apparatuses for decoding a compressed image using a neural image compression network may be provided. The method may include generating long-range context model parameters associated with a high resolution compressed image, the long-range context model parameters corresponding to a first area. The method may also include splitting the generated long-range context model parameters into a first number of context parameter blocks. The method may also include for each block in the first number of context parameter blocks, predicting respective context features using a long-range context model and respective context parameter blocks, wherein the long-range context model uses a corner-to-center latent decoding strategy or an edge-to-center latent decoding strategy to decode latents associated with the high resolution compressed image. Then, the high resolution compressed image may be reconstructed based on predicted context features.

20 Claims, 7 Drawing Sheets

(51) Int. Cl.
*H04N 19/167* (2014.01)
*H04N 19/176* (2014.01)

(56) References Cited

U.S. PATENT DOCUMENTS

2022/0191472 A1* 6/2022 Park .................... H04N 19/137
2022/0405979 A1   12/2022 Ding et al.

OTHER PUBLICATIONS

International Search Report dated Nov. 30, 2023, issued in International Application No. PCT/US23/31642.
Written Opinion dated Nov. 30, 2023, issued in International Application No. PCT/US23/31642.

* cited by examiner

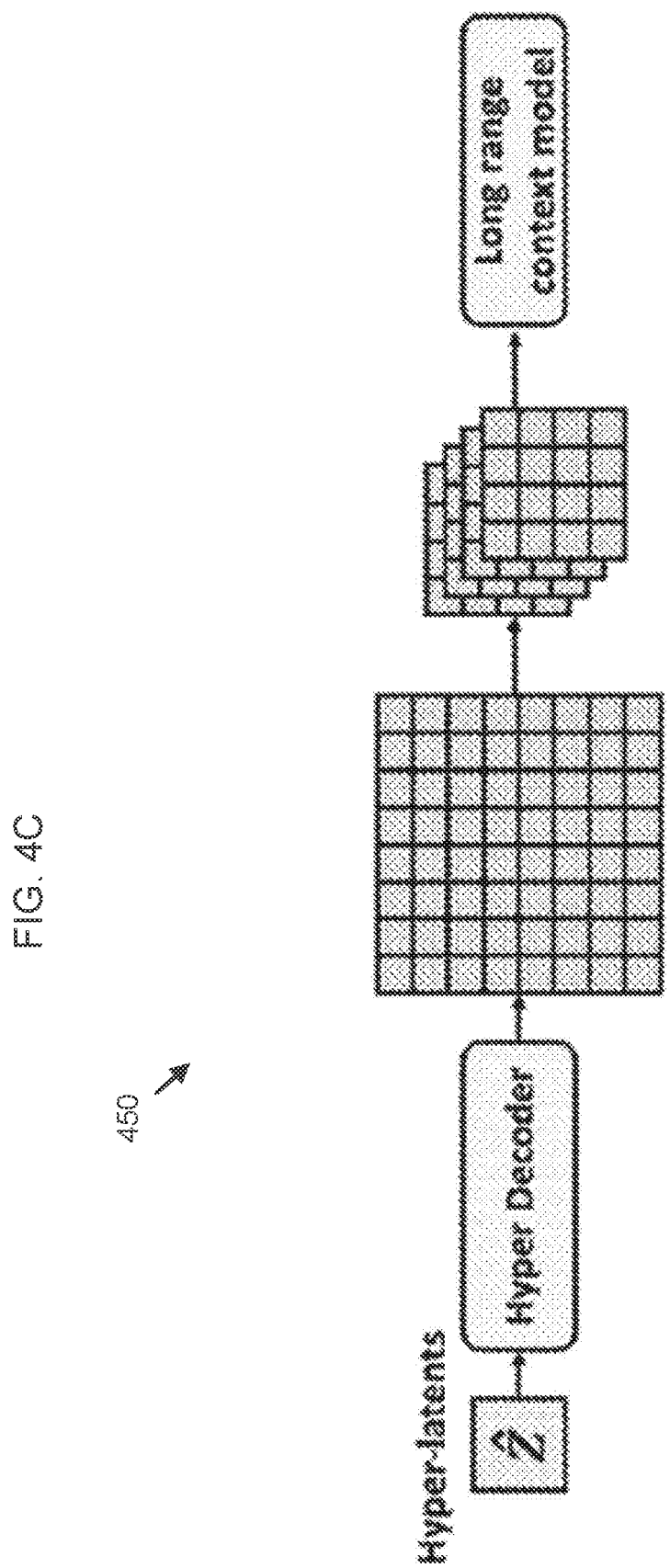

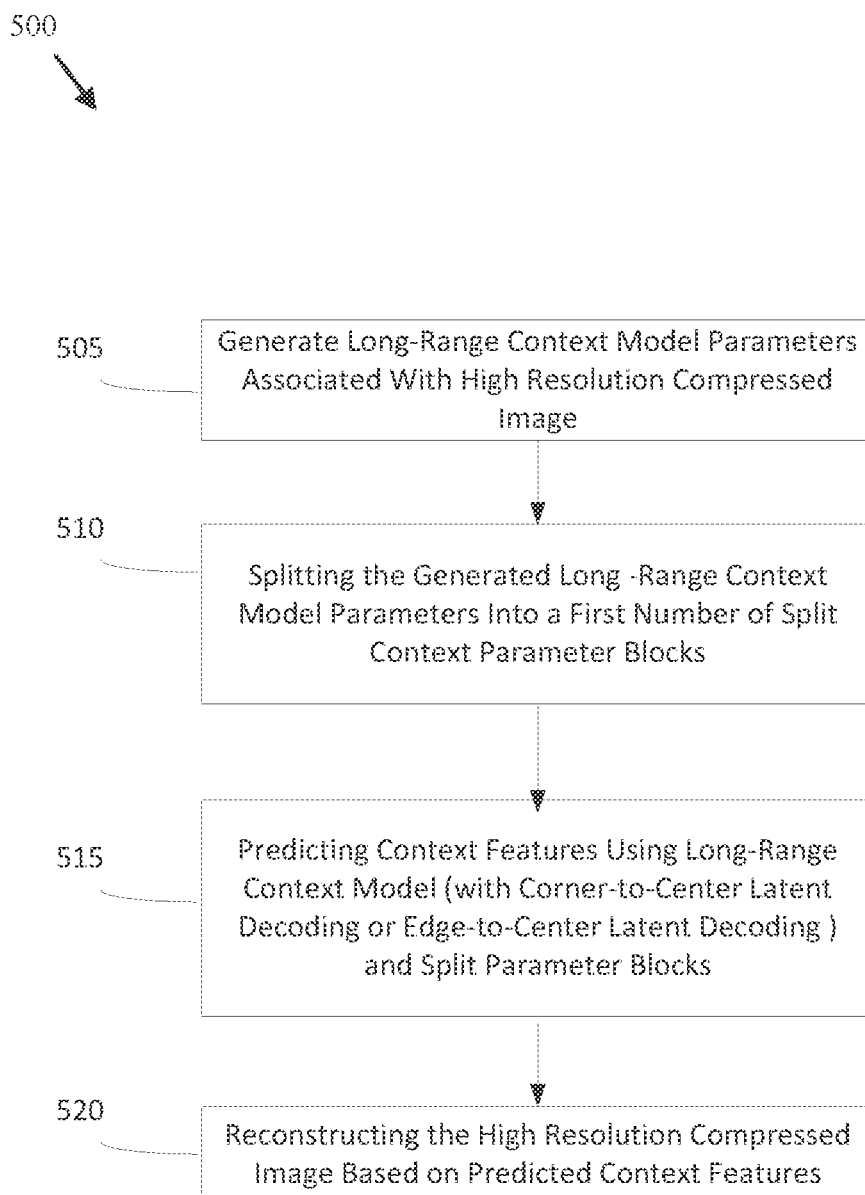

BLOCK-BASED LONG-RANGE CONTEXT MODEL IN NEURAL IMAGE COMPRESSION

CROSS-REFERENCE TO RELATED APPLICATION

This application is based on and claims priority to U.S. Provisional Patent Application No. 63/435,513, filed on Dec. 27, 2022, the disclosure of which is incorporated by reference herein in its entirety.

BACKGROUND

A traditional hybrid video codec is difficult to be optimized as a whole. An improvement of a single module may not result in a coding gain in overall performance. Recently, Standard groups and companies have been actively searching for potential needs for standardization of future video coding technology. These standard groups and companies have established JPEG-AI group focusing on AI-based end-to-end neural image compression using Deep Neural Networks (DNN). The Chinese AVS standard has also formed AVS-AI special group to work on neural image and video compression technologies. The success of recent approaches has brought more and more industrial interests in advanced neural image and video compression methodologies.

In the framework of learned image compression, the context model plays a pivotal role in capturing the dependencies among latent representations. In related art, autoregressive context models are used to reduce the decoding time resulting from the serial autoregressive context. However, due to the consecutive prediction of latents, the corresponding computational complexity of the autoregressive model is of the order of $O(n2)$ (n is the height or width of latents). Such high cost stems from the underlying scheme of the context model, which requires all previously decoded latents to predict a new latent. Therefore, a more efficient and parallelizable context model is needed to reduce the complexity of the context model and improve the efficiency of the context model.

In addition, the autoregressive context models of related art only examine the local limited receptive field (constrained by kernel size, such as 3×3, 5×5) when decoding the current latents. Therefore, context models are needed that consider global latent features more effectively.

SUMMARY

According to embodiments, methods and apparatuses are provided for implementing long-range context models in neural image compression. The embodiments disclosed herein may be applied to both encoding and decoding processes in neural image compression.

According to an aspect of the disclosure, a method for decoding a compressed image using a neural image compression network may be provided. The method may be executed by at least one processor and may include receiving a compressed image; generating context parameters associated with the compressed image, the context parameters corresponding to a first area; based on the compressed image being a high resolution image, splitting the generated context parameters into a first number of split context parameter blocks, wherein the first area is correspondingly split into a first number of split areas; for each block in the first number of split context parameter blocks, predicting respective context features using a long-range context model and respective split context parameter blocks, wherein the long-range context model uses a corner-to-center latent decoding strategy or an edge-to-center latent decoding strategy to decode latents associated with the compressed image; and reconstructing the compressed image based on the predicted context features.

According to another aspect of the disclosure, an apparatus for decoding a compressed image using a neural image compression network may be provided. The apparatus may include at least one memory configured to store computer program code; and at least one processor configured to read the computer program code and operate as instructed by the computer program code. The program code may include receiving code configured to cause the at least one processor to receive a compressed image; generating code configured to cause the at least one processor to generate context parameters associated with the compressed image, the context parameters corresponding to a first area; splitting code configured to cause the at least one processor to split, based on the compressed image being a high resolution image, splitting the generated context parameters into a first number of split context parameter blocks, wherein the first area is correspondingly split into a first number of split areas; predicting code configured to cause the at least one processor to predict, for each block in the first number of split context parameter blocks, respective context features using a long-range context model and respective split context parameter blocks, wherein the long-range context model uses a corner-to-center latent decoding strategy or an edge-to-center latent decoding strategy to decode latents associated with the compressed image; and reconstructing code configured to cause the at least one processor to reconstruct the compressed image based on predicted context features.

According to another aspect of the disclosure, a non-transitory computer-readable medium storing instructions that are executed by at least one processor, may be provided that may cause the at least one processor to receive a compressed image; generate context parameters associated with the compressed image, the context parameters corresponding to a first area; based on the compressed image being a high resolution image, split the generated context parameters into a first number of split context parameter blocks, wherein the first area is correspondingly split into a first number of split areas; for each block in the first number of split context parameter blocks, predict respective context features using a long-range context model and respective split context parameter blocks, wherein the long-range context model uses a corner-to-center latent decoding strategy or an edge-to-center latent decoding strategy to decode latents associated with the compressed image; and reconstruct the compressed image based on predicted context features.

Additional embodiments will be set forth in the description that follows and, in part, will be apparent from the description, and/or may be realized by practice of the presented embodiments of the disclosure.

BRIEF DESCRIPTION OF THE DRAWINGS

FIG. 4C is an example illustrating a block-based latents splitting strategy for parallel neural image compressing using long-range context models.

FIG. 5 is a flowchart illustrating a method for neural image compression (NIC) using a neural network, according to embodiments.

DETAILED DESCRIPTION

Figure 1:
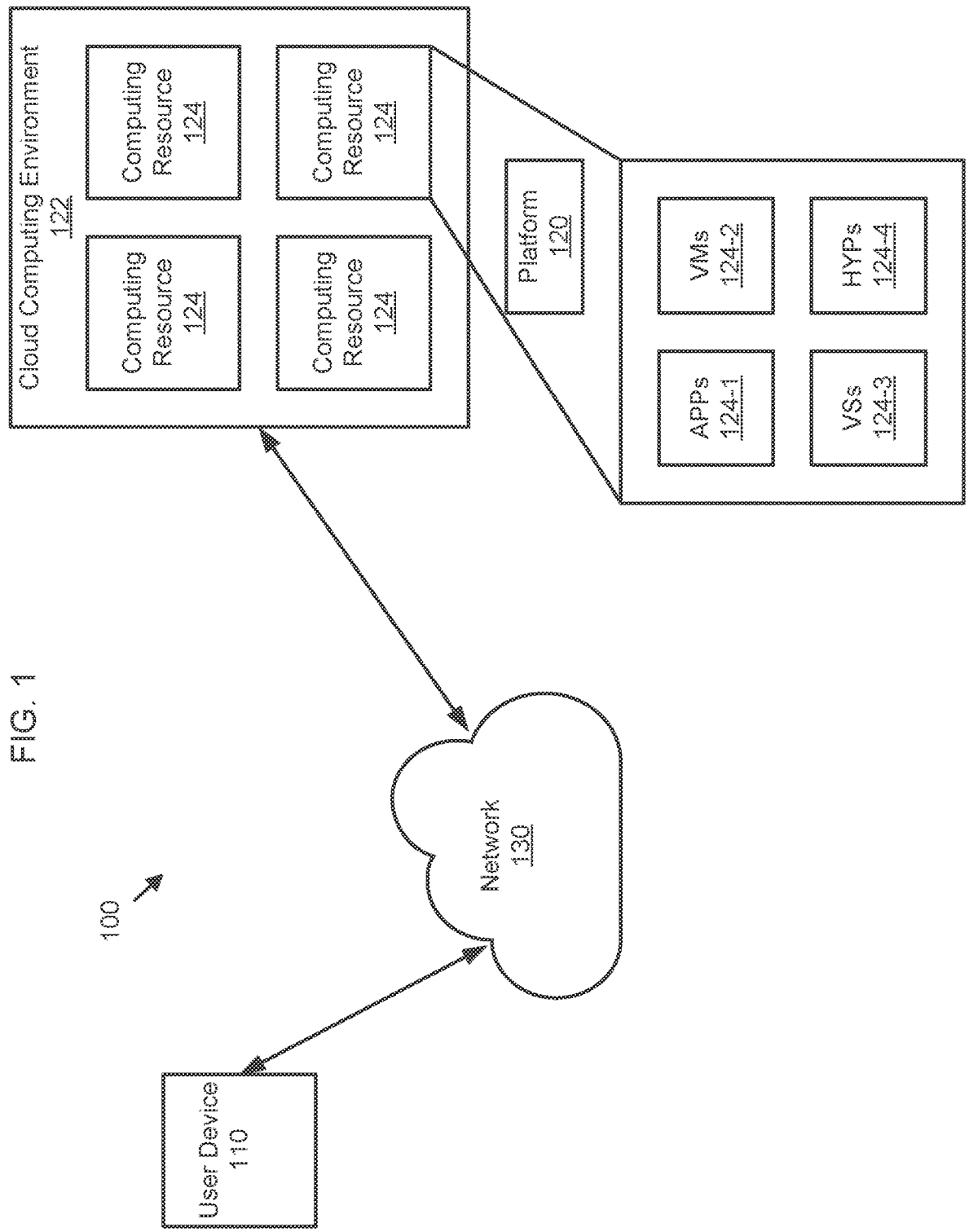
FIG. 1 is a diagram of an environment in which methods, apparatuses and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms.

Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Embodiments of the present disclosure relate to a Corner-to-Center transformer-based Context Model (C3M) or Edge-to-Center transformer-based Context Model designed to enhance context and latent predictions and improve rate-distortion performance.

A VAE-based framework (e.g., FIG. 3) utilizes a DNN-based transform as the main encoder to project the images to a low-dimensional latent space. Following quantization, the entropy estimation model predicts the distributions of latents, which are subsequently compressed into a bit stream using an arithmetic encoder aided by the estimated distribution. At the decoding end, the same entropy estimation model is applied to the arithmetic decoder to recover the latency information. This information is then fed into a DNN-based main decoder to reconstruct the original image.

Despite the context model offering promising advantages in enhancing compression performance, it incurs significant deployment costs. In general, due to the consecutive prediction of latents, the corresponding computational complexity of the autoregressive model is of the order of $O(n^2)$ (n is the height or width of latents). Such high cost stems from the underlying scheme of the context model, which requires all previously decoded latents to predict a new latent. Consequently, the autoregressive context model is incapable of concurrent execution.

Within the aforementioned learned image compression framework, a critical component is the autoregressive context model, which seeks to predict the unknown codes based on the availability of previously decoded ones. A disadvantage of the autoregressive context models in related art is that the model extracts image textures only within the local region, disregarding the global semantic information. Such incomplete causal context and restricted receptive field, by their nature, inherently limit the performance of the context model.

Therefore, to address the above-mentioned challenges, embodiments of the present disclosure are directed to an efficient and highperformance transformer-based context model, termed the Corner-to-Center Context Model (C3M). Specifically, the C3M model progressively predicts the context feature, moving from corner to center positions. At each prediction, with incremental increase in the number of to-be-predicted context features that maximizes the total received information.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
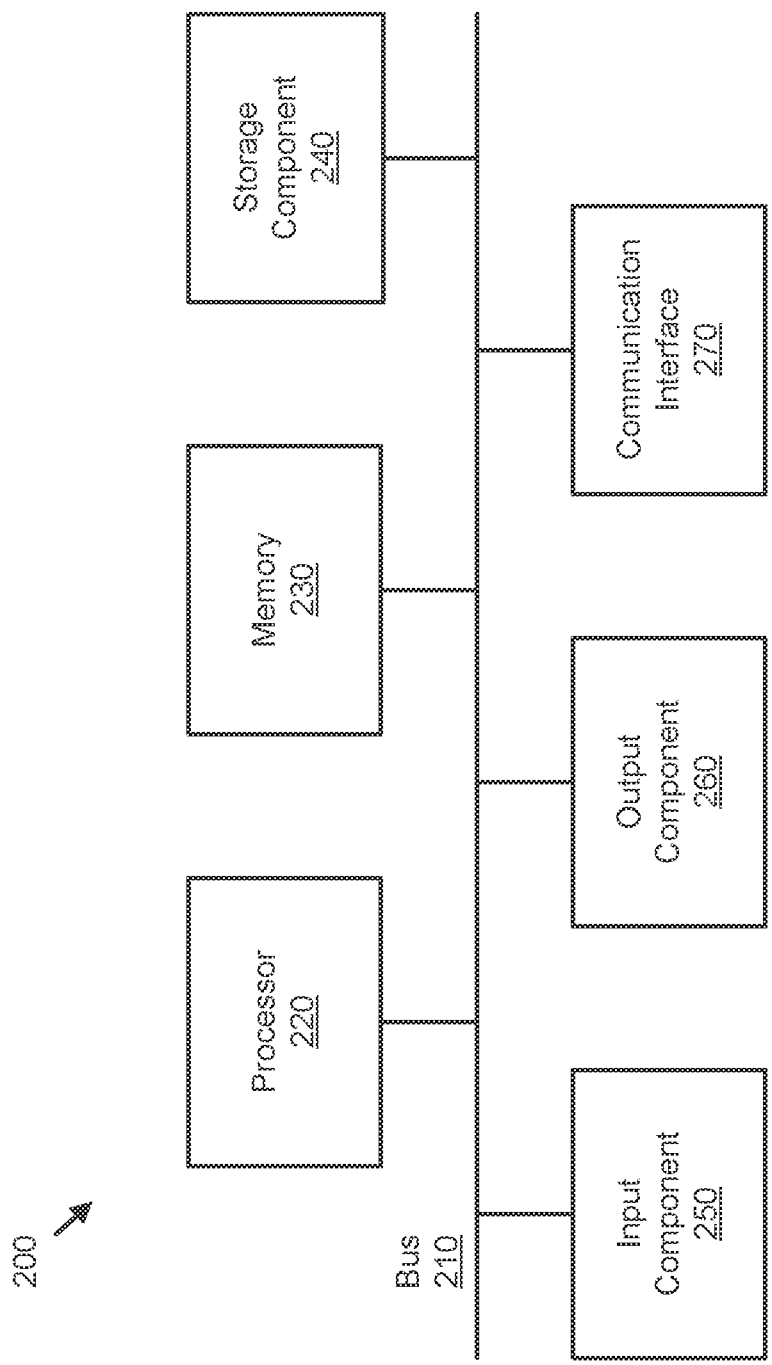
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, software, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
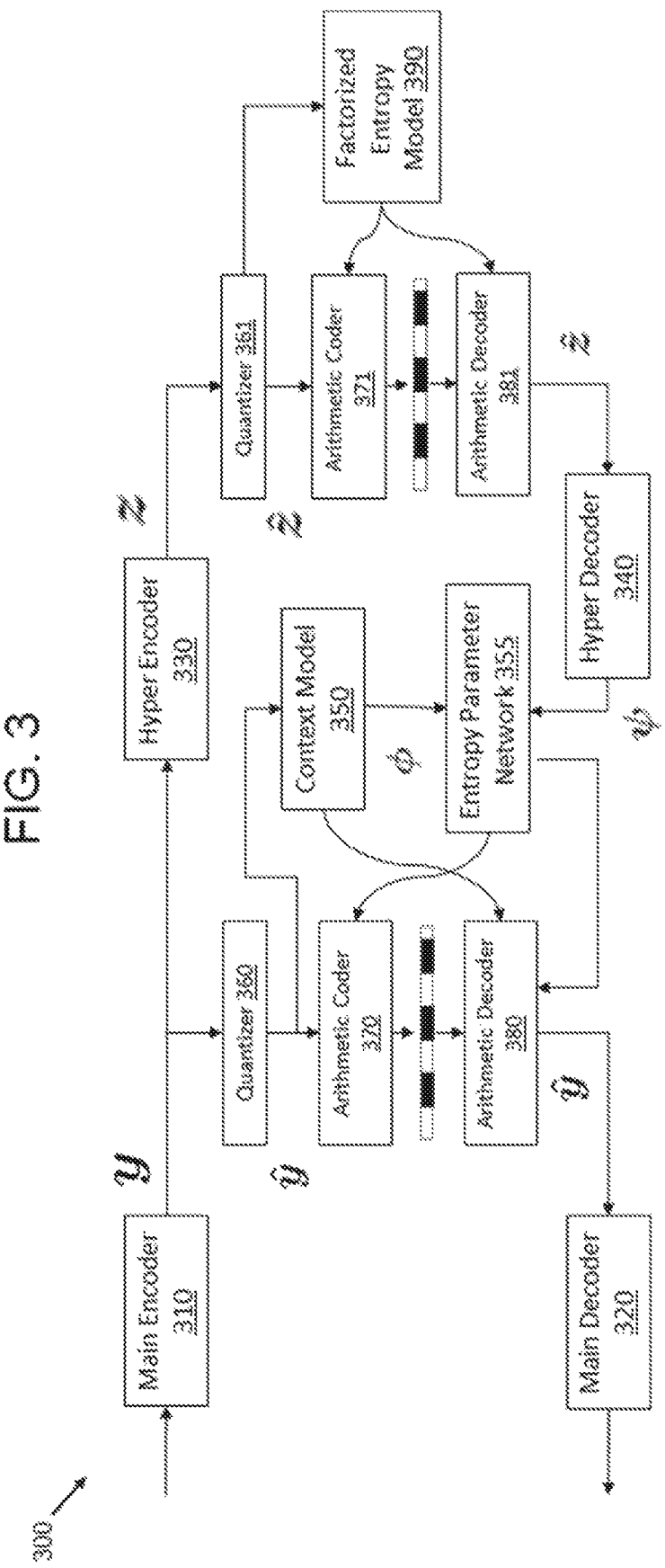
FIG. 3 illustrates an example of a framework of a variation autoencoder (VAE)-based neural image compression networks.

In embodiments, any one of the operations or processes of FIGS. 3-5 may be implemented by or using any one of the elements illustrated in FIGS. 1 and 3.

A hybrid image codec in related art is difficult to optimize. An improvement of a single module may not result in an optimal coding gain in overall performance. In contrast, in an artificial neural network-based image coding framework, by performing a machine learning process, different modules can be jointly optimized from input to output to improve a final objective (e.g., rate-distortion performance), resulting in an end-to-end (E2E) optimized Neural Image Compression (NIC).

FIG. 3 is an illustration of an exemplary block diagram 300 of a framework of a variation autoencoder (VAE)-based neural image compression networks, according to embodiments.

As shown in FIG. 3, the NIC framework includes a main encoder 310, main decoder 320, hyper encoder 330, hyper decoder 340, a context model 350, an entropy parameter network 355, and a factorized entropy model 390. The VAE-based NIC framework may include one or multiple such modules. The VAE-based NIC framework further includes a quantizer 360/361, an arithmetic coder 370/371, and an arithmetic decoder 380/381. The same or similar modules are represented by the same reference numbers. The NIC framework may include one or more modules not shown in FIG. 3.

The NIC framework may use any DNN-based image compression method, such as scale-hyperprior encoder-decoder framework (or Gaussian Mixture Likelihoods framework) and its variants, RNN-based recursive compression method and its variants.

According to embodiments of the present disclosure, an NIC framework may utilize the block diagram 300 as follows. Given an input image or video sequence x, the main encoder 310 may compute a compressed representation $\hat{i}$ or y that is compact for storage and transmission purposes when compared to the input image x. The compressed representation $\hat{i}$ may be quantized into a discrete-valued quantized representation $\hat{y}$ using quantizer 360. This discrete-valued quantized representation $\hat{y}$ may then be entropy encoded into a bitstream using the arithmetic coder 370 using arithmetic coding (lossless or lossy). On the decoder side, the bitstream may go through lossless or lossy entropy decoding using arithmetic decoder 380 to recover discrete-valued quantized representation 2. This discrete-valued quantized representation 2 may then be input into the main decoder 320 to recover and/or reconstruct the input image or video sequence $\bar{x}$. The main encoder 310 and main decoder 320 may be a neural network based encoders and decoders (e.g., DNN based coder).

In some embodiments, previous NIC methods take a variational autoencoder (VAE) structure, where the DNN encoders directly use the entire image x as its input, which is passed through a set of network layers that work like a black box to compute the output representation x. Correspondingly, the DNN decoders take the entire representation $\hat{x}$ as its input, which is passed through another set of network layers that work like another black box to compute the reconstructed $\bar{x}$.

The hyper encoder 330 may encode the compressed representation $\hat{i}$ using a series of convolution layers and Long-range Crossing Attention Modules (LCAM). Then, a hyper compressed representation of the hyper-encoded compressed representation may be generated using the quantizer 361 and the arithmetic coder 371. The arithmetic decoder 381 may decode the hyper compressed representation. Then a hyper reconstructed image x' may be generated using a hyper decoder 340. The neural network based context model 350 may be trained using the hyper reconstructed image and the quantized representation from quantizer 360. The arithmetic coder 370 and arithmetic decoder 380 may use the context model 350 for encoding and decoding, respectively.

VAE-based neural image compression architecture may further incorporates a hyperprior to effectively capture spatial dependencies in the latent representation. The context model, inspired by the concept of context from traditional codecs, may be used to predict the probability of unknown codes based on latents that have already been decoded. The latents may be generated by the main encoder 310 in VAE structure. Hyper latent and context may be used jointly to predict both the location (e.g., mean value) and scale parameter of the entropy model.

A Rate-Distortion (R-D) loss is optimized to achieve trade-off between the distortion loss $D(x, \bar{x})$ of the reconstructed image $\bar{x}$ and the bit consumption R of the compressed representation $\hat{i}$ with a trade-off hyperparameter $\lambda$ using the following target loss function L:

$$L(x, \bar{x}, \hat{x}) = \lambda D(x, \bar{x}) + R(\hat{x}) \qquad \text{Equation (1)}$$

An embodiment of the proposed long-range context model predicts a latent by focusing on the long-range global area and covering the whole latent features more effectively. Unlike autoregressive-based context mode (and its variants) and parallel-based context model (and its variants), known convolutional layer-based methods only examine the local limited receptive field (constrain by kernel size, such as 3×3, 5×5) when decoding the current latents, embodiments disclosed herein focuses on the long-range global area (can learn the dependency among entire latent and does not constrain by the kernel size), which covers the whole latent features more effectively.

An exemplary legend for FIG. 3 may be seen in Table 1 below.

TABLE 1

Exemplary Legend for FIG. 3

| Component | Symbol |
|---|---|
| Input Image | x |
| Encoder | $g_a(\bullet)$ |
| Latents | $y = g_a(x)$ |
| Quantized Latents | $\hat{y} = Q(y)$ |
| Decoder | $g_s(\bullet)$ |
| Hyper Encoder | $h_a(\bullet)$ |
| Hyper-latents | $z = h_a(y)$ |
| Quantized Hyper-latents | $\hat{z} = Q(z)$ |
| Hyper Decoder | $h_s(\bullet)$ |
| Context Parameters | $\psi = h_s(\hat{z})$ |
| Causal Context | $\hat{y}_{<i}$ |
| Context Features | $\Phi = g_{em}(\hat{y}_{<i}, \psi)$ |
| Entropy Parameter Network | $g_{ep}(\bullet)$ |
| Mean, Scale | $\mu, \sigma = g_{ep}(\psi, \Phi)$ |
| Reconstruction Image | $\hat{x} = g_s(\hat{y})$ |

Figure 4A:
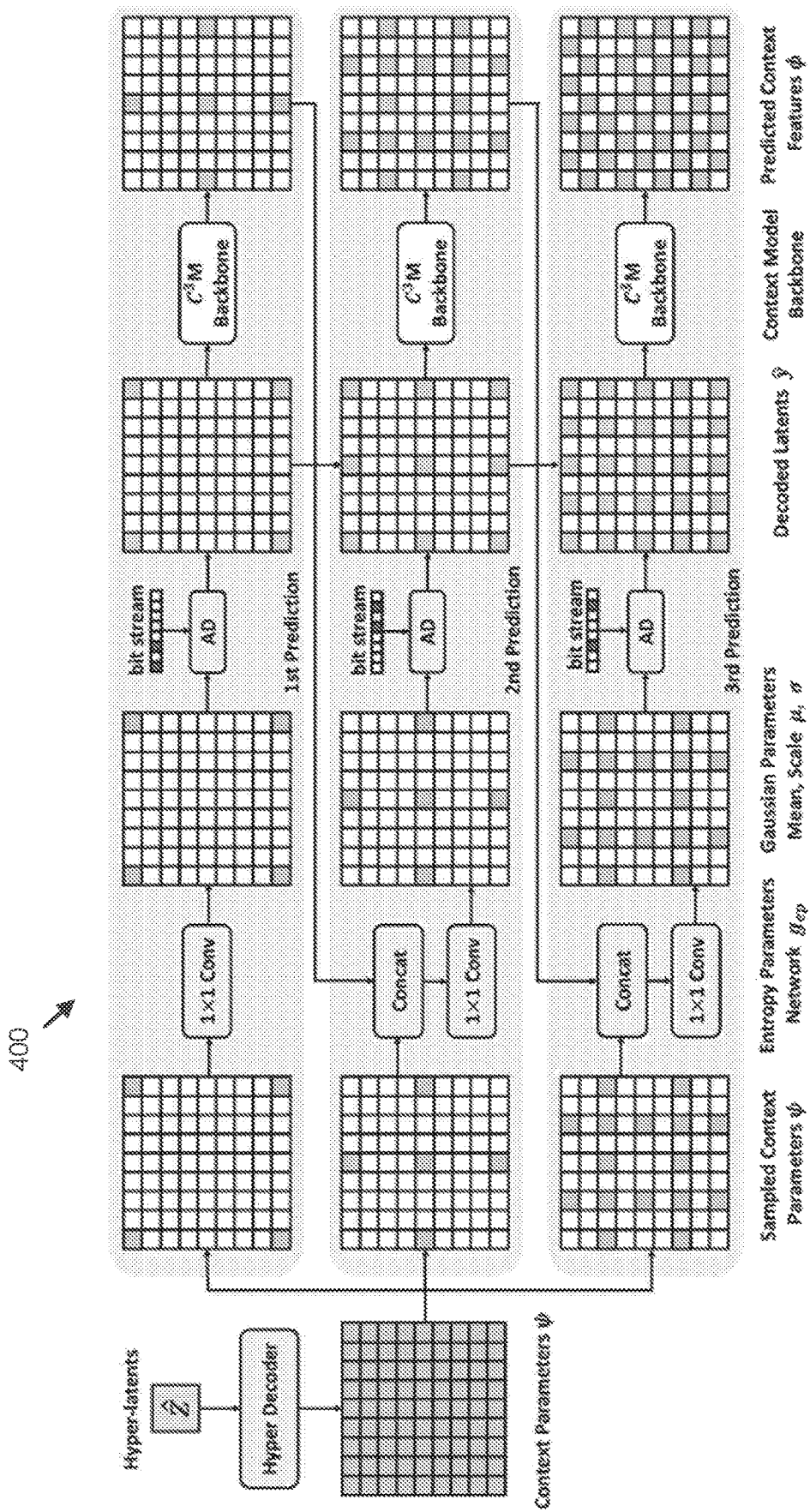
FIG. 4A is an example illustrating a prediction strategy in long-range context models.

FIG. 4A illustrates an example of prediction strategy 400 in a long-range context model.

As shown in FIG. 4A, during context modeling, at the first step, the four-corner context parameters may be sampled and fed into the Entropy Parameters network 355 to predict four pairs of corresponding mean and scale. Then, the latents may be decoded by sending corresponding bit steam to an arithmetic decoder (AD) with the help of four pairs of mean and scale. Then, the pairs and/or the previously predicted latents into the long-range context model. By using this prediction strategy, the model may predict the middle points among those latents that have already been decoded. Therefore, the context features may be predicted based on the latents in the edge area. Then, predicting the parts of remaining undecoded latents may begin by sampling context parameters corresponding to the previously predicted context features. Then, predicted context features may be stacked based on the channel dimension to predict five pairs of mean and scale corresponding to their positions. The latents may be decoded via sending the corresponding bitstream to an arithmetic decoder 381.

The embodiment discloses latents being encoded or decoded in a corner-to-center, or edge-to-center manner. In one embodiment, context parameters in the four corner of the latents may be decoded first. In another embodiment, the context parameters in the edge (the middle context parameters of the edge) of the latents may be decoded first. Embodiments do not constrain the exact encode/decode order.

In an embodiment, the width and height of the latents may be w and h, the latent space may be square, where w=h. In another embodiment, the shape of the latent space may be rectangle, where w>h, or h>w.

In related art, the traditional convolutional kernels focus on a small region (such as 3×3, 5×5, 7×7) near the to-be-predicted pixel, it can only capture the local dependencies with the texture information. To accommodate the long-range prediction, in an embodiment, a transformer-based context model may be used, since it can pay attention to the whole tokens of images, especially when predicting global dependencies with semantic information.

Figure 4B:
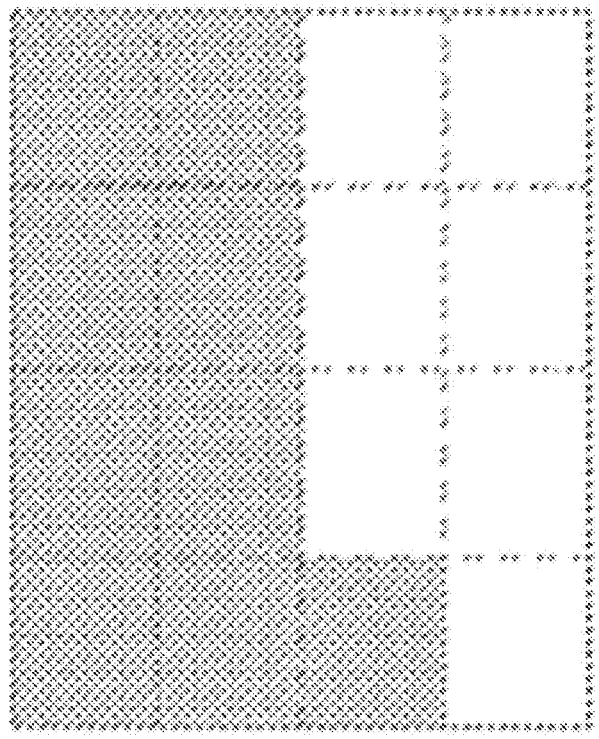
FIG. 4B is an example illustrating a block-based image splitting strategy for parallel neural image compressing using long-range context models.

FIG. 4B illustrates a block-based image splitting strategy for parallel neural image compressing using long-range context models.

In some embodiments, long-range context model that views global dependencies may not perform well in the high resolution image, as the correlation among the corner latents (edge latents) and the center latents may not be strong. According to an embodiment, splitting an image into blocks, and compress the blocks individually, then reconstruct the blocks into compressed images. As seen in FIG. 4B, the shaded blocks indicate image blocks that are individually compressed and/or reconstructed and non-shaded blocks indicate blocks that are to be compressed and/or to be reconstructed.

FIG. 4C a block-based latents splitting strategy for parallel neural image compressing using long-range context models.

In addition to the above, an embodiment may include block-wise coding that splits and/or divides the latents into blocks. As seen in FIG. 4C, latents are split into blocks for long-range context modeling. Long-range context modelling includes processing a more global feature space than regular neural network models who process a more local feature space. In some embodiments, the latents may be divided into blocks by a fixed size, such as 256×256, or 128×128. In some embodiments, the latents may be split into blocks with different sizes. In some embodiments, the size of the blocks may be based on the contents in latents, such as the variance of the latents. For some type of contents, there may be large-size blocks and small-size blocks.

FIG. 5 is an exemplary flowchart illustrating process 500 for decoding a compressed image using a neural image compression network.

At operation 505, context parameters associated with a compressed image may be generated. In some embodiments, the context parameters may correspond to a first area. In some embodiments, the first area may be one of a square area or a rectangle area. In some embodiments, operation 505 may include receiving a compressed image.

At operation 510, the generated context parameters may be into a first number of split context parameter blocks. In some embodiments, operation 510 may be conditioned on the compressed image being a high resolution image. In some embodiments, the first area may be correspondingly split into a first number of split areas. In some embodiments, wherein each of the first number of split areas has a different shape, and wherein each of the first number of split areas is one of a square area or a rectangle area.

At operation 515, for each block in the first number of split context parameter blocks, respective context features may be predicted using a long-range context model and respective split context parameter blocks, wherein the long-range context model uses a corner-to-center latent decoding strategy or an edge-to-center latent decoding strategy to decode latents associated with the compressed image.

In some embodiments, the predicting the respective context features of each of the first number of split context parameter blocks is performed in parallel or in series.

In some embodiments, predicting the respective context features may include predicting first context features using the long-range context model and first context parameters from a first split context parameter block, wherein the first context parameters correspond to first locations in a first split area, and wherein the first context features that are predicted using the first context parameters correspond to second locations in the first split area; and predicting second context features using the long-range context model and second context parameters from the first split context parameter block, wherein the second context parameters correspond to the second locations in the first split area, and wherein the second context features that are predicted using the second context parameters correspond to third locations in the first split area.

In some embodiments, the corner-to-center latent decoding strategy may include the first locations in the first split area being corner locations in the first split area, the second locations in the first split area being locations at mid-points between one or more of the corner locations, and the third locations in the first split area being locations at mid-points between one or more of the second locations.

In some embodiments, the edge-to-center latent decoding strategy may include the first locations in the first split area being edge locations in the first split area, the second locations in the first split area being locations at mid-points between one or more of the edge locations or corner locations associated respective edges of the first split area, and the third locations in the first split area being locations at mid-points between one or more of the second locations.

At operation 520, the compressed image may be reconstructed based on the predicted context features.

It is known that the above-mentioned process 500 may be modified to encode an image using a neural image compression network.

The techniques described above, can be implemented as computer software using computer-readable instructions and physically stored in one or more computer-readable media or by a specifically configured one or more hardware processors. For example, FIG. 1 shows an environment 100 suitable for implementing various embodiments. In one example, the one or more processors execute a program that is stored in a non-transitory computer-readable medium.

As used herein, the term component is intended to be broadly construed as hardware, software, or a combination of hardware and software.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a compressed image using a neural image compression network, the method being executed by at least one processor, the method comprising:
receiving a high resolution compressed image;
generating long-range context model parameters associated with the high resolution compressed image, the long-range context model parameters corresponding to a first area;
splitting the generated long-range context model parameters into a first number of context parameter blocks;
for each block in the first number of context parameter blocks, predicting respective context features using a long-range context model and respective context parameter blocks, wherein the long-range context model uses a corner-to-center latent decoding or an edge-to-center latent decoding to decode latents associated with the high resolution compressed image; and
reconstructing the high resolution compressed image based on the predicted context features.

2. The method of claim 1, wherein the predicting the respective context features of each of the first number of context parameter blocks is performed in parallel.

3. The method of claim 1, wherein the predicting the respective context features of each of the first number of context parameter blocks is performed in series.

4. The method of claim 1, wherein predicting the respective context features comprises:
predicting first context features using the long-range context model and first long-range context model parameters from a first context parameter block,
wherein the first long-range context model parameters correspond to first locations in a first split area, and
wherein the first context features that are predicted using the first long-range context model parameters correspond to second locations in the first split area; and
predicting second context features using the long-range context model and second long-range context model parameters from the first context parameter block,
wherein the second long-range context model parameters correspond to the second locations in the first split area, and
wherein the second context features that are predicted using the second long-range context model parameters correspond to third locations in the first split area.

5. The method of claim 4, wherein according to the corner-to-center latent decoding comprises:
the first locations in the first split area are corner locations in the first split area,
the second locations in the first split area are locations at mid-points between one or more of the corner locations, and
the third locations in the first split area are locations at mid-points between one or more of the second locations.

6. The method of claim 4, wherein the edge-to-center latent decoding comprises:
the first locations in the first split area being edge locations in the first split area,
the second locations in the first split area being locations at mid-points between one or more of the edge locations or corner locations associated respective edges of the first split area, and
the third locations in the first split area being locations at mid-points between one or more of the second locations.

7. The method of claim 1, wherein each of the first number of split areas has a different shape, and wherein each of the first number of split areas is one of a square area or a rectangle area.

8. The method of claim 1, wherein the long-range context model is a transformer-based context prediction model.

9. An apparatus for decoding a compressed image using a neural image compression network, the apparatus comprising:
at least one memory configured to store computer program code; and
at least one processor configured to read the computer program code and operate as instructed by the computer program code, the computer program code including:
receiving code configured to cause the at least one processor to receive a high resolution compressed image;
generating code configured to cause the at least one processor to generate long-range context model parameters associated with the high resolution compressed image, the long-range context model parameters corresponding to a first area;
splitting code configured to cause the at least one processor to split the generated long-range context model parameters into a first number of context parameter blocks;
predicting code configured to cause the at least one processor to predict, for each block in the first number of context parameter blocks, respective context features using a long-range context model and respective context parameter blocks, wherein the long-range context model uses a corner-to-center latent decoding or an edge-to-center latent decoding to decode latents associated with the high resolution compressed image; and
reconstructing code configured to cause the at least one processor to reconstruct the high resolution compressed image based on the predicted context features.

10. The apparatus of claim 9, wherein the predicting the respective context features of each of the first number of context parameter blocks is performed in parallel.

11. The apparatus of claim 9, wherein the predicting the respective context features of each of the first number of context parameter blocks is performed in series.

12. The apparatus of claim 9, wherein the predicting code is further configured to cause the at least one processor to:
predict first context features using the long-range context model and first long-range context model parameters from a first context parameter block,
wherein the first long-range context model parameters correspond to first locations in a first split area, and
wherein the first context features that are predicted using the first long-range context model parameters correspond to second locations in the first split area; and
predict second context features using the long-range context model and second long-range context model parameters from the first context parameter block,
wherein the second long-range context model parameters correspond to the second locations in the first split area, and
wherein the second context features that are predicted using the second long-range context model parameters correspond to third locations in the first split area.

13. The apparatus of claim 12, wherein according to the corner-to-center latent decoding comprises:
the first locations in the first split area are corner locations in the first split area,
the second locations in the first split area are locations at mid-points between one or more of the corner locations, and
the third locations in the first split area are locations at mid-points between one or more of the second locations.

14. The apparatus of claim 9, wherein each of the first number of split areas has a different shape, and wherein each of the first number of split areas is one of a square area or a rectangle area.

15. A non-transitory computer-readable medium storing instructions that, when executed by at least one processor of an apparatus for decoding a compressed image using a neural image compression network, cause the at least one processor to:
receive a high resolution compressed image;

generate long-range context model parameters associated with the high resolution compressed image, the long-range context model parameters corresponding to a first area;

split the generated long-range context model parameters into a first number of context parameter blocks;

for each block in the first number of context parameter blocks, predict respective context features using a long-range context model and respective context parameter blocks, wherein the long-range context model uses a corner-to-center latent decoding or an edge-to-center latent decoding to decode latents associated with the high resolution compressed image; and reconstruct the high resolution compressed image based on the predicted context features.

16. The non-transitory computer-readable medium of claim 15, wherein the predicting the respective context features of each of the first number of context parameter blocks is performed in parallel.

17. The non-transitory computer-readable medium of claim 15, wherein the predicting the respective context features of each of the first number of context parameter blocks is performed in series.

18. The non-transitory computer-readable medium of claim 15, wherein predicting the respective context features comprises:

predicting first context features using the long-range context model and first long-range context model parameters from a first context parameter block, wherein the first long-range context model parameters correspond to first locations in a first split area, and wherein the first context features that are predicted using the first long-range context model parameters correspond to second locations in the first split area; and predicting second context features using the long-range context model and second long-range context model parameters from the first context parameter block, wherein the second long-range context model parameters correspond to the second locations in the first split area, and wherein the second context features that are predicted using the second long-range context model parameters correspond to third locations in the first split area.

19. The non-transitory computer-readable medium of claim 18, wherein according to the corner-to-center latent decoding comprises:

the first locations in the first split area are corner locations in the first split area, the second locations in the first split area are locations at mid-points between one or more of the corner locations, and the third locations in the first split area are locations at mid-points between one or more of the second locations.

20. The non-transitory computer-readable medium of claim 15, wherein each of the first number of split areas has a different shape, and wherein each of the first number of split areas is one of a square area or a rectangle area.

* * * * *